(No Model.)
G. C. GRISIER.
FOUNTAIN.
No. 482,244. Patented Sept. 6, 1892.
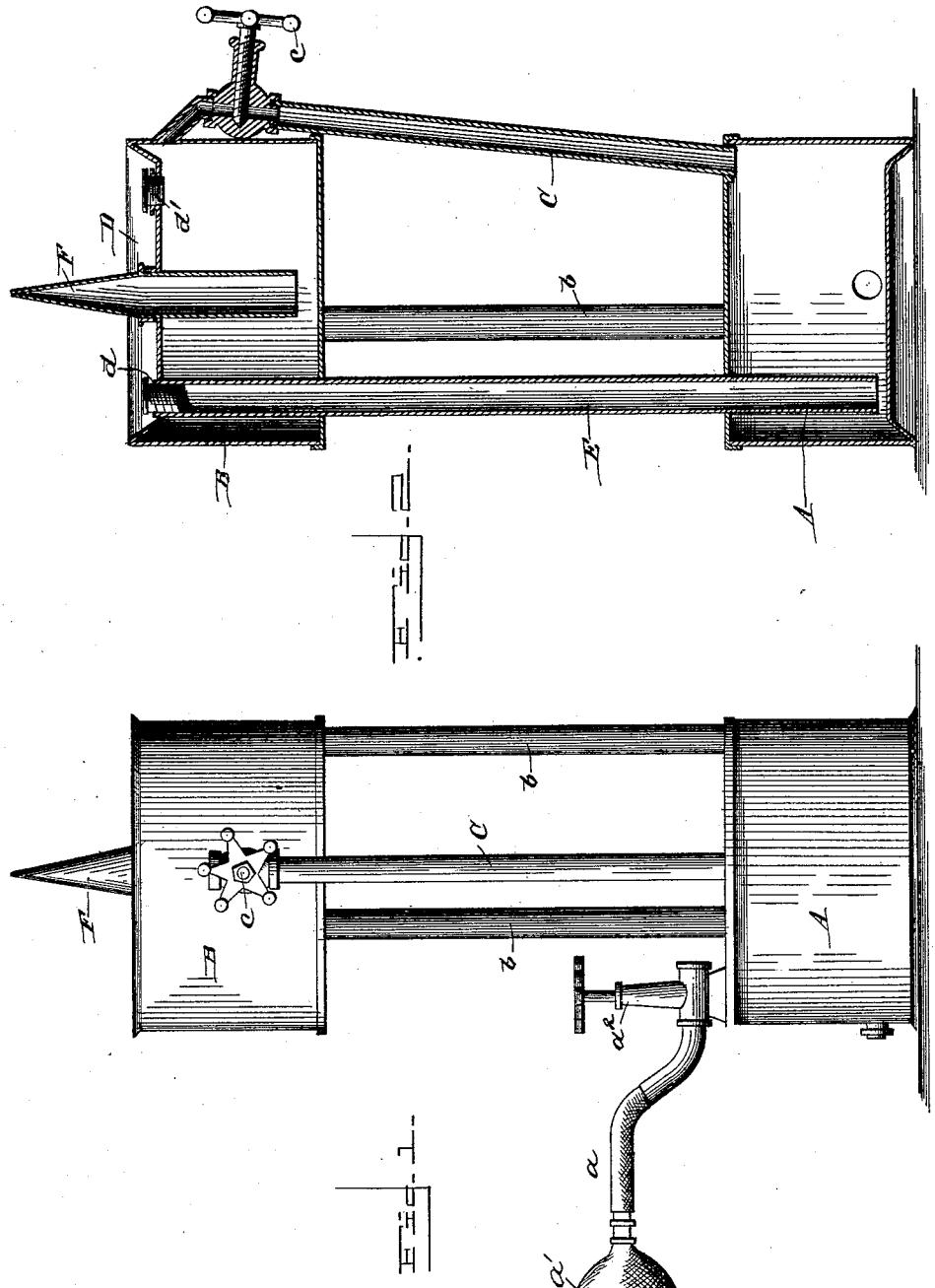
WITNESSES
Walter H. Pumphrey
S. B. Keefer
INVENTOR
George C. Grisier
by R. S. Dyrenforth
His Attorney

UNITED STATES PATENT OFFICE.

GEORGE C. GRISIER, OF JEFFERSON, IOWA.

FOUNTAIN.

SPECIFICATION forming part of Letters Patent No. 482,244, dated September 6, 1892.

Application filed June 26, 1889. Serial No. 315,681. (No model.)

*To all whom it may concern:*

Be it known that I, GEORGE C. GRISIER, a citizen of the United States, residing at Jefferson, in the county of Greene and State of Iowa, have invented certain new and useful Improvements in Fountains; and I do hereby declare the following to be a full, clear, and exact description of the invention, such as will enable others skilled in the art to which it appertains to make and use the same.

This invention relates to fountains.

The object of the invention is to produce a fountain of the class in which the water is forced upward by pressure of air caused by the flow of water into an air-tight vessel, which shall be so constructed and arranged that the water utilized to produce the pressure of air and to furnish the stream of water impelled into the outer air may be shifted by means connected with and forming part of the apparatus to a position to perform the function again and again.

With this object in view the invention consists in a fountain comprising two air-tight chambers, a basin or tank arranged contiguous to and connecting with both of the chambers, an air-pipe connecting the two chambers, a spout or nozzle arranged partially within and projecting from one chamber, and an air-forcing bulb attached to and communicating with one of the chambers.

I have illustrated the invention in the accompanying drawings, in which—

Figure 1 is a side view of a fountain constructed in accordance with my invention, and Fig. 2 is a sectional view of the apparatus.

In the drawings, A represents an air-tight vessel or receptacle designed to form the base of the apparatus, though, if desirable, it may be placed upon pillars or legs or be buried in the ground or sunken into a floor. This vessel A is provided with an air-injecting apparatus $a$ of any suitable construction, such as the compressible bulb $a'$ shown, so constructed and provided with valves that by compressing the bulb air will be forced into the chamber, and that when the bulb expands the communication between it and the chamber will be cut off and commuication with the outer air established.

$a^2$ represents a cut-off or valve arranged between the air-forcing apparatus and the vessel A.

B represents an elevated chamber or tank supported upon any suitable legs or base, such as the legs $b$. This vessel or tank B is air-tight and communicates with the tank A through the air-pipe C, which is provided with the valve or cut-off $c$.

On top of the tank or reservoir B is an indentation forming a basin D, designed to contain water. The bottom of the basin is provided with two openings $d$ and $d'$, each provided with removable plugs or caps. One of these openings communicates with the pipe E, which forms a conduit for carrying the water from the basin to the vessel A.

F represents a tube which extends from a point near the bottom of the vessel B up through the top of the same, forming an outlet for the water to be forced up into the air.

In the operation of the device the basin on top of the tank or reservoir B is filled with water and the cap or stopper from the opening $d'$ in the bottom of the basin, which communicates with the tank or reservoir B, is removed and the tank allowed to fill with water. When the tank is filled, the cap or stopper $d'$ closing the opening in its top is closed, the other cap $d$, allowing communication between the basin and the bottom reservoir or tank A, removed, and the valve $c$ in the air-pipe opened. The result is to allow the water in the basin to descend, partially filling the lower tank and compressing the air contained therein. The air thus compressed rises through the air-pipe C to the upper chamber, and by reason of its pressure on the water contained in this upper chamber causes a stream of water to rise through the outlet-nozzle.

In order that the same water may be used over and over again, the air-compressor $a$ is employed and operates as follows: As soon as all the water from chamber B is exhausted, the plug in opening $d$ is removed, thus allowing water in the basin to pass to chamber A, after which the plug is inserted in the said opening and the valve $c$ is closed. The air-compressor is now operated until a sufficient pressure is attained, when the plugs in the openings $d\ d'$ are removed, thus allowing the water to pass from the lower chamber to the basin, and from thence into the upper chamber. The plugs are again inserted in their respective openings, the valve c is opened, and the air-compressor operated, supplying air under pressure to the upper chamber B through pipe C, when the contents of the latter chamber will be forced out through nozzle F in an obvious manner.

Having thus fully described my invention, what I claim as new, and desire to secure by Letters Patent, is—

A fountain comprising a lower air-tight chamber having an air-compressor connecting with its top, a valve located between the chamber and the source of pressure, an upper air-tight chamber having a basin-like top provided with an opening communicating with the latter reservoir, an escape-pipe opening into the bottom of the basin portion and connecting with and extending to within a short distance of the bottom of the lower chamber, an air-pipe connecting with the top of the lower chamber and entering the upper chamber near its top, a valve carried by the latter pipe, a jet-nozzle extending from near the bottom to without the upper reservoir, and plugs or stoppers for closing the opening in the escape-pipe and in the basin, substantially as described.

In testimony whereof I affix my signature in presence of two witnesses.

GEORGE C. GRISIER.

Witnesses:
   JOHN NEWBURN,
   CHAS. C. PEARL.